US009173199B2

(12) United States Patent
Garner et al.

(10) Patent No.: US 9,173,199 B2
(45) Date of Patent: Oct. 27, 2015

(54) RADIO MODULE AS WEB-CONTROLLABLE REMOTE SENSOR

(71) Applicant: Aeris Communications, Inc., Santa Clara, CA (US)

(72) Inventors: Michael Garner, Richardson, TX (US); Yixiang Chen, Palo Alto, CA (US)

(73) Assignee: AERIS COMMUNICATIONS, INC., Santa Clara, CA (US)

( * ) Notice: Subject to any disclaimer, the term of this patent is extended or adjusted under 35 U.S.C. 154(b) by 283 days.

(21) Appl. No.: 13/735,765

(22) Filed: Jan. 7, 2013

(65) Prior Publication Data

US 2014/0192660 A1    Jul. 10, 2014

(51) Int. Cl.
| | |
|---|---|
| H04L 29/08 | (2006.01) |
| H04W 4/14 | (2009.01) |
| H04W 72/04 | (2009.01) |
| H04L 29/12 | (2006.01) |

(52) U.S. Cl.
CPC ............. *H04W 72/04* (2013.01); *H04L 67/025* (2013.01); *H04L 61/303* (2013.01); *H04L 67/02* (2013.01); *H04W 4/14* (2013.01)

(58) Field of Classification Search
None
See application file for complete search history.

(56) References Cited

U.S. PATENT DOCUMENTS

| | | | |
|---|---|---|---|
| 7,324,804 B2 | 1/2008 | Hrastar et al. | |
| 7,349,761 B1 | 3/2008 | Cruse | |
| 7,895,257 B2 | 2/2011 | Helal et al. | |
| 7,982,603 B2 | 7/2011 | Moriwaki et al. | |
| 8,125,328 B2 | 2/2012 | Sartini et al. | |
| 8,149,849 B2 | 4/2012 | Osborn et al. | |
| 8,533,253 B2 | 9/2013 | McCoy | |
| 2006/0179168 A1* | 8/2006 | Clark et al. ....................... 710/8 |
| 2008/0004994 A1 | 1/2008 | Ainsworth et al. | |
| 2013/0151708 A1* | 6/2013 | Shelby et al. ................. 709/226 |
| 2013/0286951 A1 | 10/2013 | Viswanathan et al. | |
| 2014/0136508 A1* | 5/2014 | Lyngbaek et al. ............ 707/709 |

FOREIGN PATENT DOCUMENTS

JP        2004128821        4/2004

OTHER PUBLICATIONS

Jayavardhana Gubbi, et al., "Internet of Things (IoT): A vision, architectural elements, and future directions," Future Generation Computer Systems, vol. 29, Issue 7, Sep. 2013, pp. 1645-1660.
Pablo Punal Pereira, et al., "Enabling Cloud-connectivity for Mobile Internet of Things Applications," IEEE Seventh International Symposium on Service-Oriented System Engineering, 2013, pp. 518-526, http://pure.ltu.se/portal/files/49591930/06525570.pdf.
Nissanka B. Priyantha, et al., "Tiny Web Services: Design and Implementation of Interoperable and Evolvable Sensor Networks," Proceedings of the 6th ACM conference on Embedded network sensor systems, ACM, 2008, pp. 253-266, http://131.107.65.14/en-us/um/people/zhao/pubs/tws08.pdf.

* cited by examiner

*Primary Examiner* — Kodzovi Acolatse
(74) *Attorney, Agent, or Firm* — Sawyer Law Group, P.C.

(57) ABSTRACT

The present invention provides for network control of a radio module having a plurality of input/output (I/O) ports capable of communication with one or more sensing devices across a network, where the radio module may be controlled remotely to obtain information from one or more networked remote sensing devices.

17 Claims, 8 Drawing Sheets

RADIO MODULE AS WEB-CONTROLLABLE REMOTE SENSOR

FIELD OF THE INVENTION

The present invention relates generally to communications networks, and more particularly to providing remote monitoring and control capability for embedded input/output (I/O) across one or more communications networks.

BACKGROUND OF THE INVENTION

Communications devices are used throughout most of the world and are often designed and developed to operate with at least one, if not more than one, communications network. Each communications device is uniquely identified within a network and is often uniquely identified within the network, thereby enabling a communications source device to contact the receiving device through connection points across the network. Similarly, each communications device is tracked on a network for its use of bandwidth in operation on one or more networks.

These communications devices are often in the form of a cellular-based devices, (e.g., phones, smartphones, etc.), sensor-based devices (watering systems, parking meters, alarm indicators, etc.), or other data intensive devices capable of communicating on a network. Still other devices may include one-way communicating equipment, such as medical emergency or alarm-based equipment that contacts a receiving device or system across a network. The use of the term communications device or "device" herein is not intended to be limited to examples set forth, but rather incorporates and includes any device capable of communicating on, with, and/or across a communications network, wired or wireless, and thereby uses network resources of bandwidth to upload, download, transmit, receive, or transceive data. Examples of devices may include: laptops with 3G or WIFI capability; smartphones with 3G, 4G or CDMA/GSM; alarm systems across a publicly switched telephone network (PSTN) line; texting equipment; a machine-to-machine (M2M) environment; and similar.

In many applications, a communications device may not be physically connected with a communications network and may be able to connect with multiple communications networks owned by different entities. Tracking the use of a particular device on various networks is an important activity as the use of a network's bandwidth is typically the primary source of monetization for operators of a network.

Figure 1:
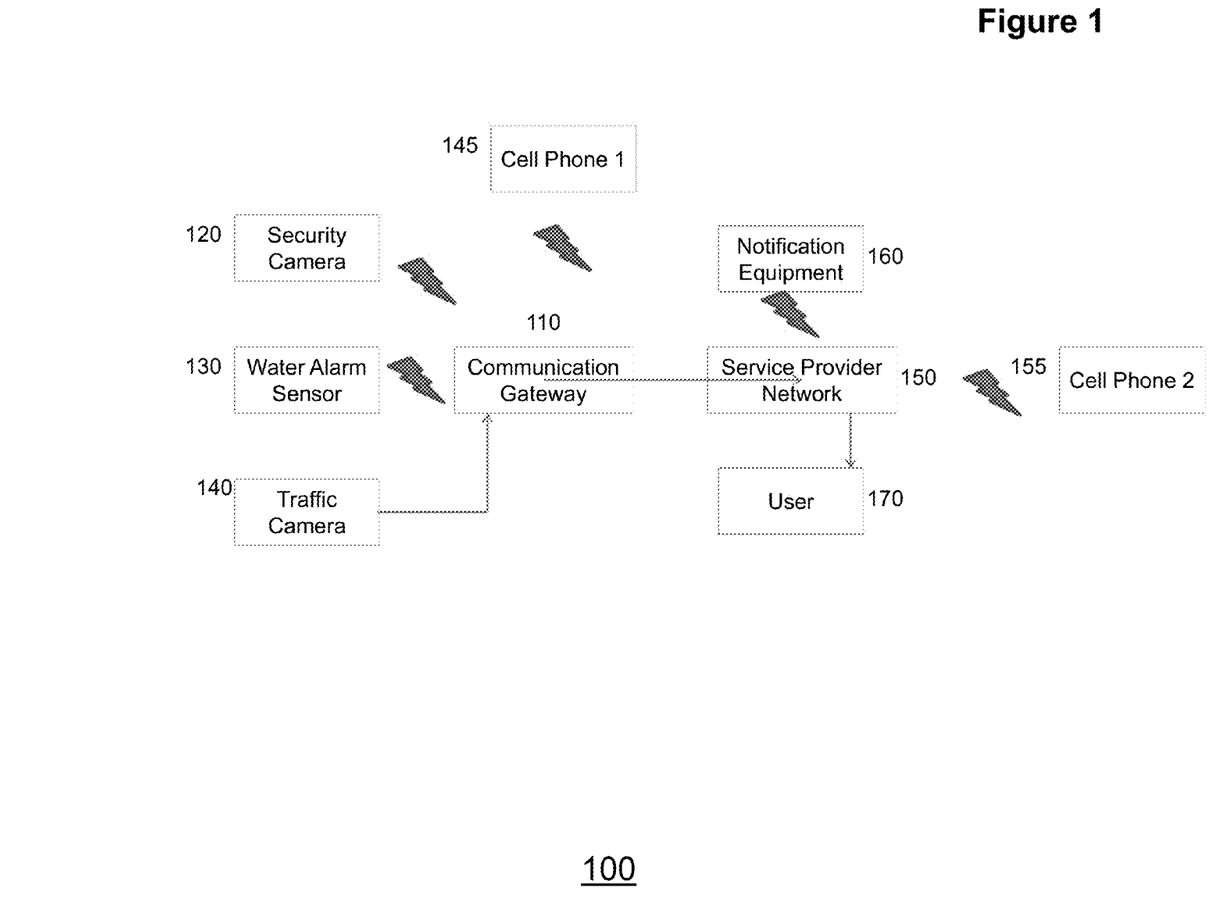
FIG. 1 depicts a basic M2M communication network having typical sensor-type devices.

FIG. 1 depicts a basic M2M communication network 100 having typical sensor-type devices 120, 130 and 140. Cell phones at 145 and 155 are also provided. In FIG. 1, the M2M network 100 has a central communication gateway 110 in which communications from devices 120, 130, 140, and 145 are linked with a service provider network 150. The linkage may be wired or wireless, and is depicted as the security camera 120 and the water alarm sensor 130 are in wireless communication with the gateway 110. Similarly, the traffic camera sensor 140 is in wired communication with the gateway, though one will appreciate that there are many variations to the type and protocol of communication for FIG. 1. As one can appreciate, there may be many variations and types of devices included for a M2M communication network and communication-capable devices thereon.

From FIG. 1, data sensed and obtained by the devices is transmitted across the M2M network to the service provider network 150 where the data may be shared as raw data or converted to information, often though software applications. Notification equipment 160 wirelessly receives the data from the service provider network 150, as may the cell phone 155, and acts in accordance with the received data for the specific event. For instance where the notification equipment is an alert system to send a text to a building owner in the event of a water leak, and the water sensor has sent data indicating a water leak, the notification equipment will then trigger an event to notify the building owner.

Similarly, from FIG. 1, where the user 170 receives a suite of rolling historical data as to traffic camera operation cycles, the user may then act accordingly based on the received cumulative information. The transmission and receipt of data across the network from varied devices can be tracked on a per device basis, a per grouping of device basis, and across the network. The usage of data by a device is often then billed to a device-owning consumer (or user) based on a consumption rate plan that provides for a certain amount of time and/or use of data by a device owned by the user.

In certain M2M applications, particularly those in the telemetry space, to monitor and control a remote device usually requires a number of components to be present, including: (1) a central processing unit (CPU) to run the remote application and control the radio module associated with the device; (2) non-volatile random access memory (NVRAM) to store the operating system, application code and data; (3) I/O interfaces; and (4) a Radio Module for remote access.

Figure 2:
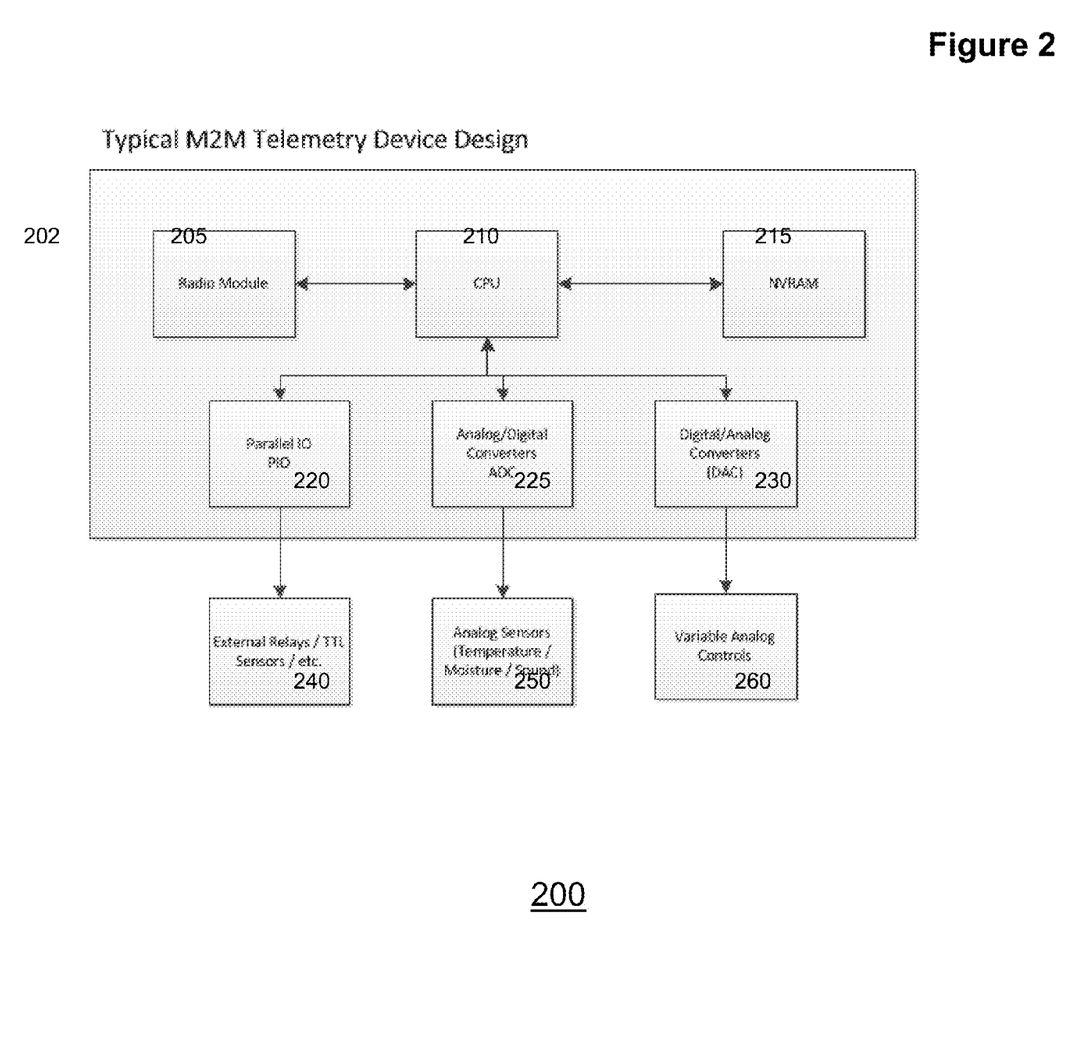
FIG. 2 sets forth a typical M2M telemetry device design for monitoring and controlling a remote device.

Further to the description above, FIG. 2 sets forth a typical M2M telemetry device design 200 for monitoring and controlling a remote device.

From FIG. 2, components for a typical M2M telemetry device design used for controlling a remote device, such as remote sensor devices, are set forth at 202. Within 202 are included a radio module 205, a CPU 210, a NVRAM 215, a Parallel Identifier (PID) 220, an Analog-to-digital converter (ADC) 225, and a Digital-to-analog converter (DAC) 230. The CPU is generally central to the communication pathways of the components of the controlling device of 202. Remote devices being sensors 240, 250 and 260 are available for communications with the controlling device 202, where control information is passed from the controlling device 202 to the remote sensors to instruct what information or monitoring is sought. Examples of sensors are set forth in FIG. 2 as an external relay 240, an analog sensor 250, and a variable analog control 260, though one will appreciate there may be many variations and types used with the present invention.

However, each of these component requirements for the controlling device, in addition to those involving low-level application code requirements, add cost and complexity to the device and often may create certain product development delays associated with the complexities of the device design. Further, the development of low level application code is often quite complex, time consuming and expensive, and in generally is often a main cause of product development delays for such device designs.

Figure 3:
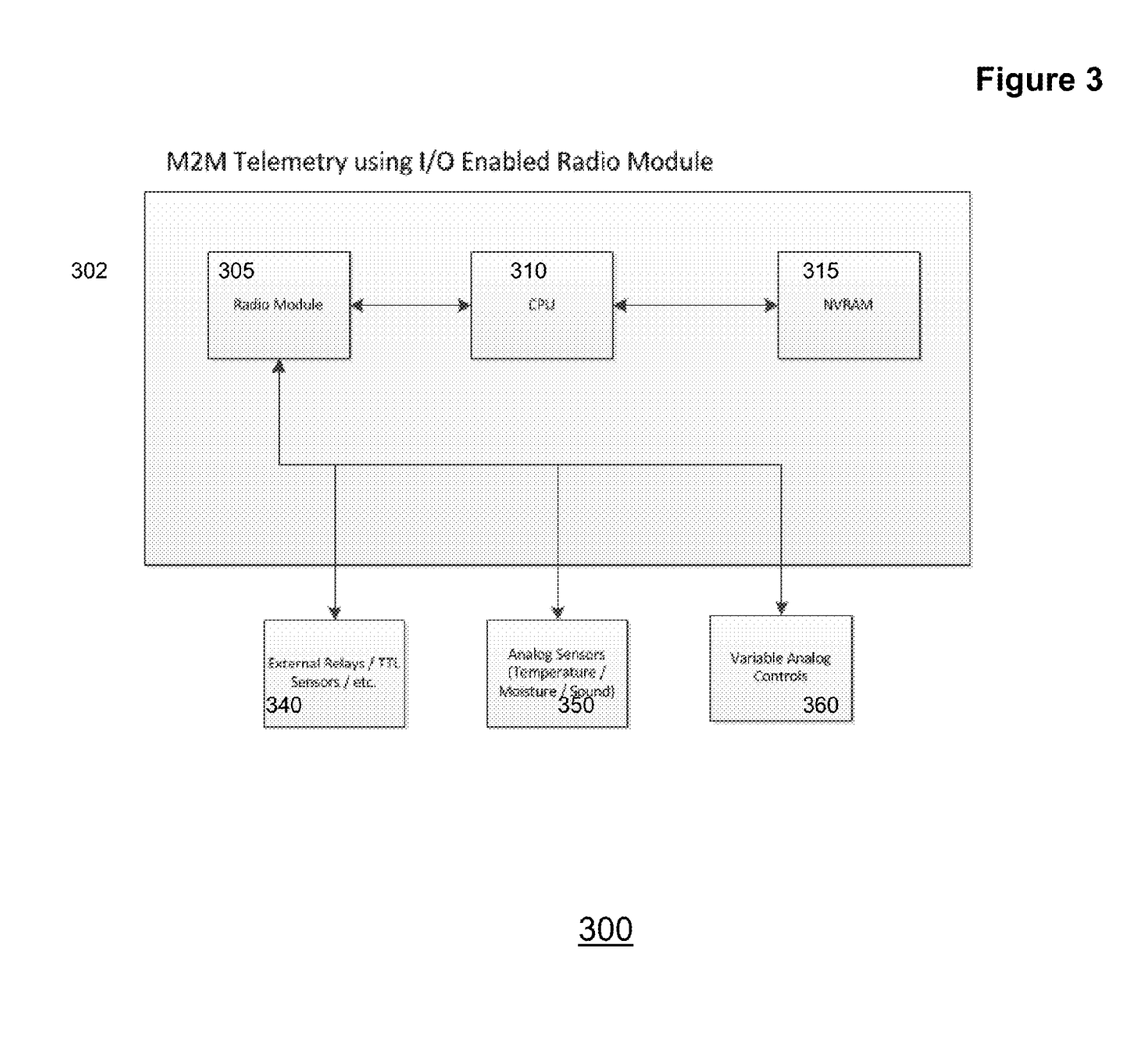
FIG. 3 sets forth a M2M telemetry device design using I/O enabled modules.

Further to the above, FIG. 3 sets forth a M2M telemetry device design using I/O enabled modules 300.

From FIG. 3, a radio module 305 is in communication with a CPU 310 and NVRAM 315, as well as with remote sensors 340, 350 and 360. The radio module is I/O enabled having input/output communications with the sensors, reducing the need for ADC, DAC and PID to be communication intermediaries with the remote sensors as shown in FIG. 2. A radio module, such as that of 305, may provide direct I/O capabilities including: General Purpose Digital I/O (GPIO), ADC, DAC and voltage output controls (VOC), for instance.

Unfortunately, from FIG. 3, even where developers may be able to realize a design advantage, there is often an economic disincentive for this approach as though hardware costs and board design simplification may occur; these capabilities often require expensive components, such as the CPU, NVRAM and the operating system, to be present on the device. For instance, though the radio module is I/O enabled, the presence of additional components such as CPU, NVRAM and operating system is still necessary locally. Also, often a radio module and CPU are underpowered to adequately perform in this environment. Additionally, the development time associated with such an approach may still be very long and difficult. Further, design errors are known to arise, particularly where, in an effort to reduce development costs, the failure to include critical capabilities such as remote firmware updates may occur.

Additionally, web-based uniform resource indicators (URIs) are often used to identify resources associated with a network, such as devices. URIs can include locators (URLs), names (URNs), etc., where typically the URI provides information to define an identity of or method for locating the resource. However, web-based hyper text transfer protocol (HTTP) URIs can often be cumbersome though they may often be convenient for human consumption. These URIs are often lengthy and complex in form and need to be transmitted accurately, in their entirety, for appropriate operations.

For example, a URI may take the form of: "/1751234567/GPIO/1" which is descriptive to a web browser (also used herein as a "fully descriptive URI"). The fully descriptive URI format associates the 1751234567 with a module ID that is globally unique to the radio module; it associates the GPIO with a general purpose I/O type ID for a port, although there may be multiple types of I/O ports present; and it associates the 1 with a port ID that is unique within the I/O port type identified. Often, these details are populated by the radio module manufacturer.

Therefore, what is needed is a cost-effective and lesser-intensive component content approach which will allow monitoring and control of remote devices using a radio module's built-in I/O capabilities, while eliminating the requirement for firmware application development and expensive component requirements to be locally present, such as a CPU or NVRAM, for instance. What is also needed is an improved method of providing a less cumbersome approach of relevant information typically associated with a fully descriptive URI. It is therefore desired to provide such an approach as that above which further enables developers to realize a reduction in hardware costs, an elimination of license fees and a simplified software development process by providing for network control of a radio module.

SUMMARY OF THE INVENTION

The present invention fulfills these needs and has been developed in response to the present state of the art, and in particular, in response to the problems and needs in the art that have not yet been fully solved by currently available technologies.

The present invention provides an approach for radio modules having enhanced I/O capabilities which are able to control and monitor one or more remote devices, without the need for the presence of CPU, NVRAM, real-time operating system (RTOS), firmware development, and remote firmware updated update capability. In so doing, the present invention provides developers the ability to realize significant reductions in build cost and development time.

One embodiment of the present invention includes a method of providing network control of a radio module having a plurality of input/output (I/O) ports capable of communication with one or more sensing devices across a network, and having a network controlling mechanism in communication with the radio module. In one or more preferred embodiments, the methods includes identifying a uniform resource indicator (URI) for each of the one or more sensing devices on the network; predetermining a physical mapping of each identified URI with one of the plurality of I/O ports of the radio module; and, communicating at least one command from the radio module to at least one of the one or more sensing devices via the physical mapping over a predetermined protocol across the network. Optionally, the method also provides for receiving a response from the at least one of the one or more sensing devices in relation to the communicated at least one command, where the response may be received via a web browser, for instance.

Another embodiment of the present invention provides a computer program product stored on a computer usable medium, comprising: computer readable program means for causing a computer to control an execution of an application to perform a method for providing network control of a radio module having a plurality of input/output (I/O) ports capable of communication with one or more sensing devices across a network, and having a network controlling mechanism in communication with the radio module. Preferably, the product provides for: identifying a uniform resource indicator (URI) for each of the one or more sensing devices on the network; predetermining a physical mapping of each identified URI with one of the plurality of I/O ports of the radio module; communicating at least one command from the radio module to at least one of the one or more sensing devices via the physical mapping over a predetermined protocol across the network; and, receiving a response from the at least one of the one or more sensing devices in relation to the communicated at least one command.

A further embodiment of the present invention provides a telemetry device having a plurality of input/output (I/O) ports capable of communication with one or more sensing devices across a network, and having a network controlling mechanism in communication with the radio module. Preferably, the device includes processing means to identify a uniform resource indicator (URI) for each of the one or more sensing devices on the network; predetermine a physical mapping of each identified URI with one of the plurality of I/O ports of the radio module; and, communicate at least one command from the radio module to at least one of the one or more sensing devices via the physical mapping over a predetermined protocol across the network.

A further embodiment provides for receiving a request having a fully descriptive URI addressed to a radio module, mapping the module ID of the request to a network ID and uniquely identifying a communications network through a relational association. In a preferred embodiment, a radio module manufacture predefines an encoding association for the I/O type ID and the port ID portions of the fully descriptive URI enabling a relational association of a fully descriptive I/O type ID and port ID to be substituted with a reduced I/O type ID and port ID description.

DETAILED DESCRIPTION OF PREFERRED EMBODIMENTS

The present invention relates generally to a process for providing network control of a radio module having a plurality of input/output (I/O) ports capable of communication with one or more sensing devices across a network, and having a network controlling mechanism in communication with the radio module.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Advantageously, the present invention provides a user the ability to rapidly implement M2M solutions at a lower build cost with less development effort when using the invention. The present invention also provide numerous benefits to the module manufacturer such as by assisting them in achieving better economics for their radio modules as users will recognize a reduction in costs for other related hardware and development areas.

Figure 4:
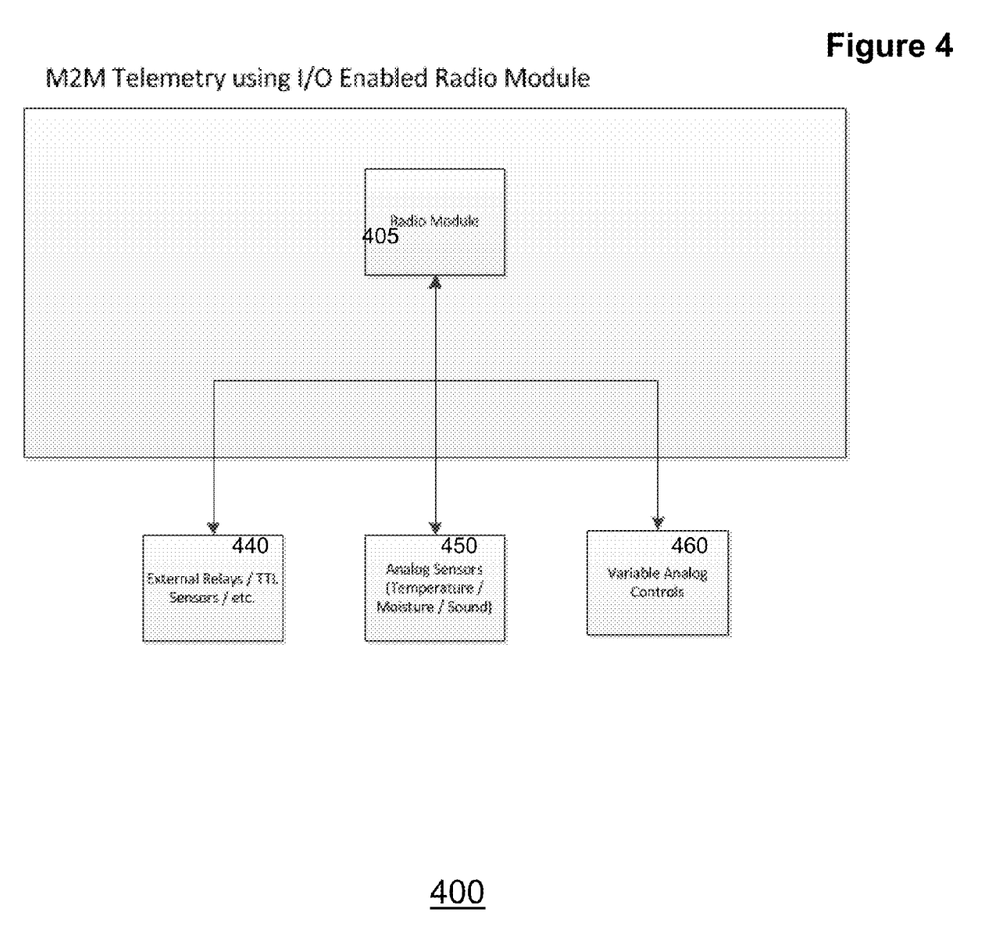
FIG. 4 sets forth a flowchart of communication as between the radio module and connected devices on the network for the present invention in accordance with one or more preferred embodiments.

In one or more preferred embodiments, the present invention provides for a method of providing network control of a radio module having a plurality of input/output (I/O) ports capable of communication with one or more sensing devices across a network. Preferably the radio module further includes a network controlling mechanism in communication with the radio module, such as software, a processor, controller, or similar. FIG. 4 sets forth a flowchart of communication 400 as between the radio module and connected devices on the network for the present invention in accordance with one or more preferred embodiments.

From FIG. 4, a radio module of the present invention 405 having a network controlling mechanism and having a plurality of I/O ports is in communication with remote sensors 440, 450 and 460. The radio module of the present invention has a uniform resource indicator (URI) identified for each of the one or more sensing devices associated with the radio module on the network. Preferably, a predetermined physical mapping of each identified URI is associated with one of the plurality of I/O ports of the radio module, hence such that each device is associated with a physical I/O pin. Once a mapping is determined, communications as from the radio module to the sensing device may occur, where a remote network command, such as through a web browser, is set forth.

For instance, for one or more embodiments of the present invention, where at least one command is provided from the radio module to at least one of the one or more sensing devices via the physical mapping over the predetermined protocol across the network, the remote device may be summoned to provide information. Information of the remote device may include measured information, typically of a unit of a measure (e.g., temperature, pressure, on/off, etc.). The information of the networked device is returned to the radio module across the respective I/O pin associated with the device, and the received information is preferably communicated to a web portal or browser. Such an approach is advantageous as typically radio module CPUs are too underpowered to accommodate demands involving commands, controlling and monitoring. Rather the present invention provides an approach for controlling and monitoring the remote device using a radio module via a network control of the radio module.

Figure 5:
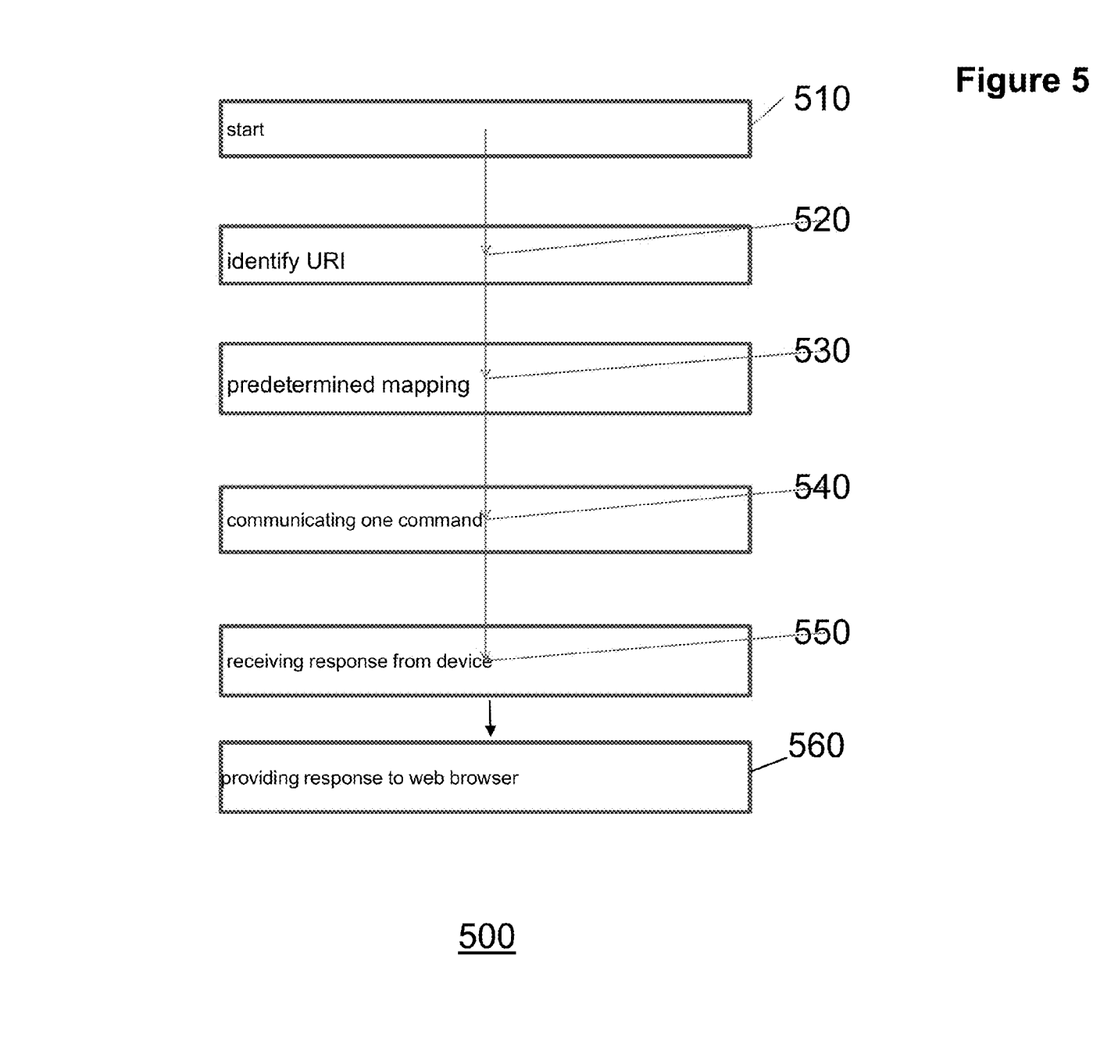
FIG. 5 sets forth a flowchart of the present invention in accordance with one embodiment.

FIG. 5 sets forth a flowchart 500 of the present invention in accordance with one embodiment. From FIG. 5, the method begins at 510 and a uniform resource indicator (URI) is identified for each of the one or more sensing devices on the network at 520. At 530, a predetermined physical mapping of each identified URI with one of the plurality of I/O ports of the radio module is set forth. At 540, at least one command from the radio module is communicated to at least one of the one or more sensing devices via the physical mapping over a predetermined protocol across the network, such as HTTP. At 550, a response from the at least one of the one or more sensing devices is received in relation to the communicated at least one command. At 560, the response of information is provided and/or displayed via a web browser. The information provided is typically of a unit of measure associated with the remote device.

Figure 6:
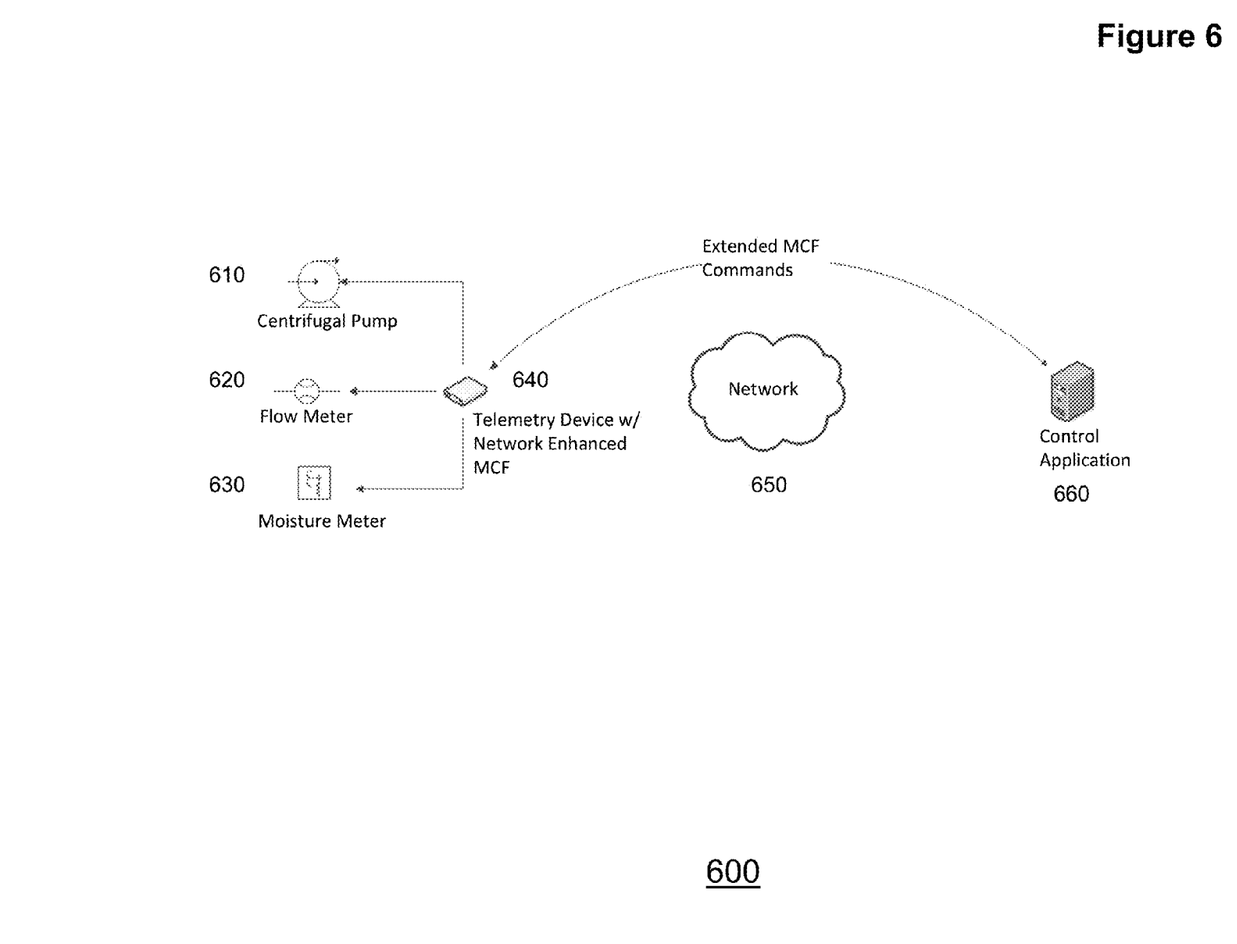
FIG. 6 depicts an operational communication flow 600 in accordance with one or more embodiments of the present invention.

FIG. 6 depicts an operational communication flow 600 in accordance with one or more embodiments of the present invention. From FIG. 6, remote devices are displayed at 610, 620 and 630. Remote device 610 is depicted as a pump. Remote device 620 is depicted as a flow meter. Remote device 630 is depicted as a moisture meter. At 640 is a radio module (also used herein as a telemetry device) having a network controlling mechanism as well as a plurality of input/output (I/O) pins, of the present invention. The radio module depicted at 640 is able to communicate with the remote devices through the I/O pins when commanded remotely, by a web browser, web-enabled application or other remote command.

At 660, a control application is set forth which provides for commands and controlling of the radio module 640 to undertake the requesting, receiving, transmitting, transceiving of data and information from one or more remote devices. Since the control application 660 is remote from the radio module 640, communications as between the two would occur across a network such as 650. Commands across the network would be those which may provide control and monitor types of commands from the control application to the radio module, for instance.

In operation, the radio module of the present invention in one or more embodiments may further include an embedded constrained application protocol (CoAP) stack. Where an embedded CoAP is provided, a fixed URI binding for each I/O interface (i.e., pin) may also be provided such that the radio module is able to interpret each URI as a data URI for each of the identified remote devices. In effect, the radio module of the present invention provides for a CoAP capable sensor. By example, "/1/1" is to request reading from GPIO port 1. The present invention also provides for a HTTP-to-CoAP proxy residing in the network such that connecting CoAP-capable M2M devices to web applications is possible using the present invention. In the depiction of FIG. 6, the network 650 provides for a HTTP-to-CoAP proxy, for example.

Figure 7:
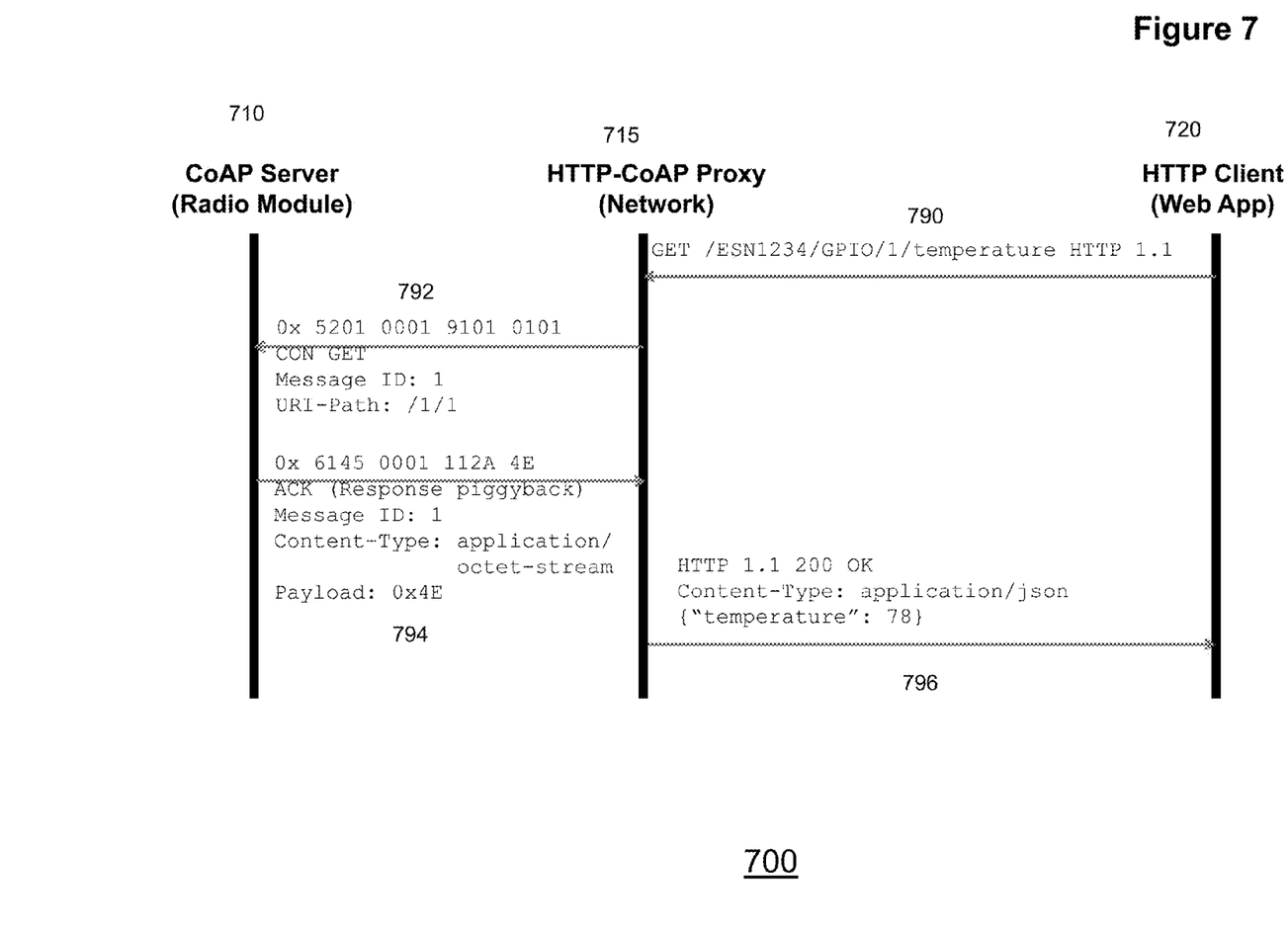
FIG. 7 depicts message traffic as between the web application and the radio module in one or more embodiments of the present invention; and, FIG. 8 sets forth an example of an implementation of the present invention in which I/O and port IDs of a fully descriptive URI are substituted for reduced ID descriptions.

FIG. 7 depicts message traffic 700 as between the web application and the radio module in one or more embodiments of the present invention. From FIG. 7, at 710, the radio module is provided. At 715, a network having a HTTP-CoAP proxy is provided. At 720, a web client is provided. A command is sent from the web application remotely to control the radio module at 790, in the example seeking to get temperature information from a temperature measuring remote device. At 792, the remote command is translated through the proxy and the radio module is commanded to seek information across the respective physical I/O of the sought device (in this case, by example, pin 1). At 794, the data is obtained from the remote device and is returned to the radio module across the respective pin and then to the network, which was mapped in accordance with the URI or uniform resource locator (URL) of the respective device. The network provides the data of the device to the web application or web browser at 796, in this example being a temperature reading of 78 degrees. In this manner, the radio module is controlled across the network by the web application, where a physical mapping of the URI/URL of the device and the physical I/O is predetermined.

Figure 8:
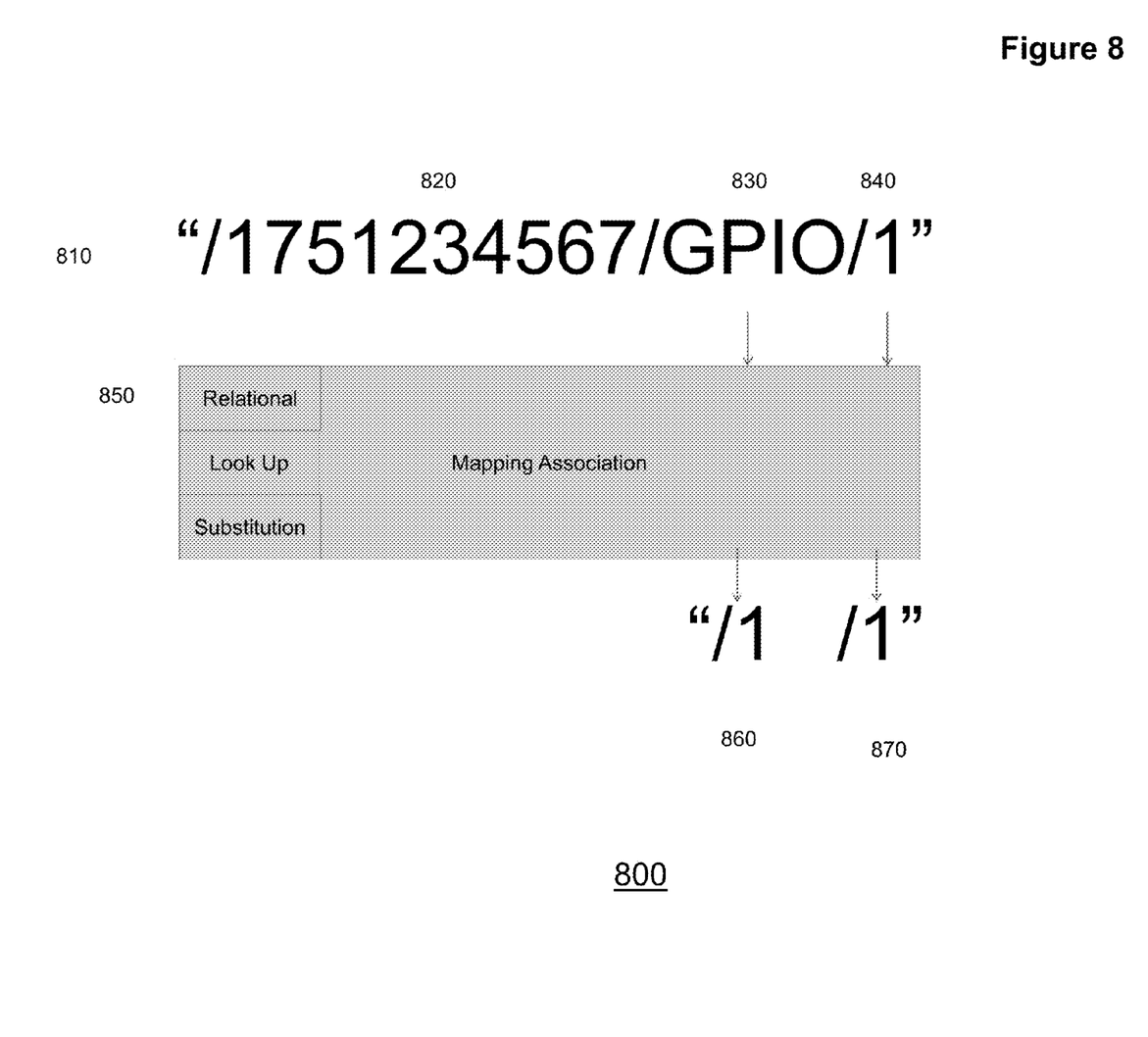

FIG. 8 sets forth an example of an implementation 800 of the present invention in which I/O and port IDs of a fully descriptive URI are substituted for reduced ID descriptions. From FIG. 8, a fully descriptive URI is set forth at 810. The URI has the form "/1751234567/GPIO/1" in which the URI format associates the 1751234567 with a module ID (820) that is globally unique to the radio module; the GPIO is associated with a general purpose I/O type ID for a port (830); and the 1 is associated with a port ID that is unique within the I/O port type identified (840). Typically, these details may be predefined by the radio module manufacturer.

Using a mapping association 850 of the present invention, the fully descriptive URI can be substituted to a reduced URI which is less complex and intensive. For example, integers may be substituted using the mapping association to define input/output types on the radio module. In such a manner, the I/O type ID and port ID portions of the fully descriptive URI of "GPIO/1" may be mapped to be "1/1" (860/870). The mapping association 850 may include a look-up table, a conversion or association means, software having predetermined mapping and/or associated substitute identities, or other methods and approaches, for instance. Optionally, a radio module manufacture or other may also predefined or encode equivalent substitutes for the fully descriptive URI format portions, such that a look-up association or substitution equivalence is provided where reference can readily be made to import, amend or substitute a shorter or other referential equivalent to the URI portion affected.

Preferably, using the present invention, a web application can perform following operations to discover I/O ports' URIs and retrieve data from them using a variety of methods including any of those below (where the HTTP header "content-type" is used to indicate data encoding of the port data):

| HTTP Action | URI | Operation |
| --- | --- | --- |
| GET | /module_id | Retrieve all I/O type identifiers on a module with the module_id. |
| GET | /module_id/io_type_id | Retrieve all I/O ports identifiers defined for the I/O type on a module. |
| GET | /module_id/io_type_id/port_id | Retrieve data from the given port |

Advantageously, using the present invention, once a substitution has been made for at least a portion of the fully descriptive URI, a receiving of a request of the fully descriptive URI via web application can associate a substitute or reduced value for the pertinent URI portion using a mapping association and shorten the URI to the predetermined or planned substitute equivalence. Thereafter, the receiver of the original URI can then transmit a shortened or substituted URI to the radio module, preferably over the air. In this approach, using the present invention, a web application is able to use a fully descriptive URI which can then be mapped to a shortened URI in a network for efficient over-the-air transfer to the radio module.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses applications through a connected means such as but not limited to a web browser, terminal, mobile application (i.e., app) or similar while the primary software and data are stored on servers or locations apart from the devices.

As used herein the terms device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, wireless local area network (WIFI), and one or more wired networks.

Advantageously, the present invention provides developers the ability to realize significant reductions in build cost and development time, as the typical application based on the enhanced modules would no longer require any of the following: CPU; NVRAM; RTOS; Firmware development; and Remote firmware update capability. Further, the present invention will allow monitoring and control of the embedded module's built in I/O capabilities remotely via remote application protocol interface (APIs).

What is claimed is:

1. A method of providing network control of a an Input/Output (I/O) enabled radio module having a plurality of I/O ports capable of communication with one or more sensing devices across a network, and having a network controlling mechanism in communication with the radio module, comprising:
   identifying a uniform resource indicator (URI) for each of the one or more sensing devices on the network;
   predetermining a physical mapping of each identified URI with one of the plurality of I/O ports of the radio module;
   communicating at least one command from the radio module to at least one of the one or more sensing devices via the physical mapping over a predetermined protocol across the network, wherein the at least one command is physically mapped to a respective URI and a physical I/O pin;
   associating a mapping for reducing one or more identifiers of a fully descriptive URI to one or more reduced identifiers for a reduced URI; and
   in response to receiving a fully descriptive URI, transmitting the reduced URI over air.

2. The method of claim 1, further comprising receiving a response from the at least one of the one or more sensing devices in relation to the communicated at least one command.

3. The method of claim 2, wherein the received response is received by a web-based application across the network or a user interface being a web application.

4. The method of claim 3, wherein the web application is a web browser.

5. The method of claim 3, wherein the received response includes information of at least one of the one or more sensing devices.

6. The method of claim 5, wherein the information includes a measurement of a unit of measure from the at least one of the one or more sensing devices.

7. The method of claim 6, wherein the unit of measure is degrees for a sensing device that measures temperature and wherein the protocol is HTTP.

8. The method of claim 5, wherein the network controlling mechanism is one of a processor, a controller, or software.

9. The method of claim 8, wherein the at least one command is a HTTP request.

10. The method of claim 9, wherein the HTTP request is mapped to a respective URI and physical I/O pin.

11. The method of claim 9, wherein the received response is received by the respective physical I/O pin and is communicated to a web browser.

12. A computer program product stored on a non-transitory computer usable medium, comprising program for causing a computer to control an execution of an application to perform a method for providing network control of a an Input/Output (I/O) enabled radio module having a plurality of I/O ports capable of communication with one or more sensing devices across a network, and having a network controlling mechanism in communication with the radio module, the method comprising:
   identifying a uniform resource indicator (URI) for each of the one or more sensing devices on the network;
   predetermining a physical mapping of each identified URI with one of the plurality of I/O ports of the radio module;
   communicating at least one command from the radio module to at least one of the one or more sensing devices via the physical mapping over a predetermined protocol across the network, wherein the at least one command is physically mapped to a respective URI and a physical I/O pin;
   receiving a response from the at least one of the one or more sensing devices in relation to the communicated at least one command;
   associating a mapping for reducing one or more identifiers of a fully descriptive URI to one or more reduced identifiers for a reduced URI; and
   in response to the received response including a fully descriptive URI, transmitting the reduced URI over air.

13. The program product of claim 12, wherein the received response is received by a web-based application across the network.

14. The program product of claim 13, wherein the received response is received by a user interface being a web application or a web browser.

15. The program product of claim 12, wherein the received response includes information of at least one of the one or more sensing devices.

16. An Input/Output (I/O) enabled radio device comprising:
   a plurality of input/output (I/O) ports capable of communication with one or more sensing devices across a network, and a network controlling mechanism, wherein the networking mechanism includes a processor configured to:
   identify a uniform resource indicator (URI) for each of the one or more sensing devices on the network;
   predetermine a physical mapping of each identified URI with one of the plurality of I/O ports; and,
   communicate at least one command to at least one of the one or more sensing devices via the physical mapping over a predetermined protocol across the network, wherein the at least one command is physically mapped to a respective URI and a physical I/O pin;
   associate a mapping for reducing one or more identifiers of a fully descriptive URI to one or more reduced identifiers for a reduced URI; and
   in response to receiving a fully descriptive URI, transmitting the reduced URI over air.

17. The radio module of claim 16, wherein the at least one command is communicated to a web browser.

* * * * *